(12) United States Patent
Seo et al.

(10) Patent No.: US 10,824,051 B2
(45) Date of Patent: Nov. 3, 2020

(54) APERTURE MODULE AND CAMERA MODULE INCLUDING THE SAME

(71) Applicant: SAMSUNG ELECTRO-MECHANICS CO., LTD., Suwon-si (KR)

(72) Inventors: Bo Sung Seo, Suwon-si (KR); Young Bok Yoon, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 16/503,846

(22) Filed: Jul. 5, 2019

(65) Prior Publication Data

US 2020/0241387 A1     Jul. 30, 2020

(30) Foreign Application Priority Data

Jan. 29, 2019  (KR) .................. 10-2019-0011428

(51) Int. Cl.
```
G03B 9/06      (2006.01)
G03B 5/04      (2006.01)
G03B 13/36     (2006.01)
```
(52) U.S. Cl.
CPC ............. *G03B 9/06* (2013.01); *G03B 5/04* (2013.01); *G03B 13/36* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 2006/0033974 A1* | 2/2006 | Sato | G03B 21/2053 359/227 |
| 2012/0076486 A1 | 3/2012 | Bai et al. | |
| 2019/0346749 A1* | 11/2019 | Seo | G03B 17/565 |
| 2019/0377239 A1* | 12/2019 | Lee | G03B 9/06 |
| 2020/0241387 A1* | 7/2020 | Seo | G03B 9/06 |
| 2020/0249545 A1* | 8/2020 | Wang | G03B 9/06 |

FOREIGN PATENT DOCUMENTS

| | | |
|---|---|---|
| JP | 2002-162665 A | 6/2002 |
| JP | 2005-018020 A | 1/2005 |
| KR | 10-2009-0048841 A | 5/2009 |
| KR | 10-2012-0032433 A | 4/2012 |
| KR | 10-1477247 B1 | 12/2014 |
| KR | 10-2016-0014057 A | 2/2016 |
| KR | 10-2017-0099435 A | 9/2017 |
| WO | WO 2015/001519 A2 | 1/2015 |

OTHER PUBLICATIONS

Korean Office Action dated Mar. 23, 2020 in corresponding Korean Patent Application No. 10-2019-0011428 (9 pages in English, 7 pages in Korean).

\* cited by examiner

*Primary Examiner* — William B Perkey
(74) *Attorney, Agent, or Firm* — NSIP Law

(57) ABSTRACT

An aperture module includes blades to form an incident hole having a variable size, a magnet portion including a driving magnet opposing a driving coil to allow the magnet portion to be linearly movable, and a rotation plate linked to the magnet portion and to the blades to convert linear motion of the magnet portion into rotational motion of the blades. The blades include a first blade having N sides (N being a positive integer) that form the incident hole, and a second blade having (N+1) sides that form the incident hole. The incident hole is in the form of a polygon having an odd number of sides.

16 Claims, 13 Drawing Sheets

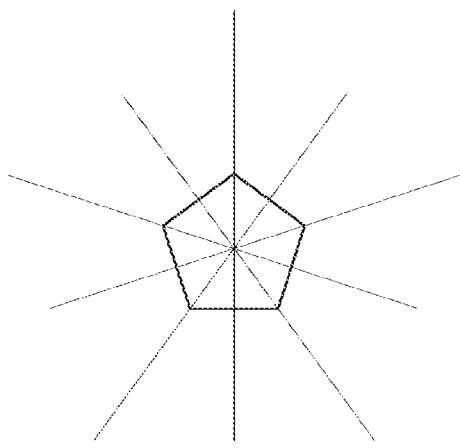
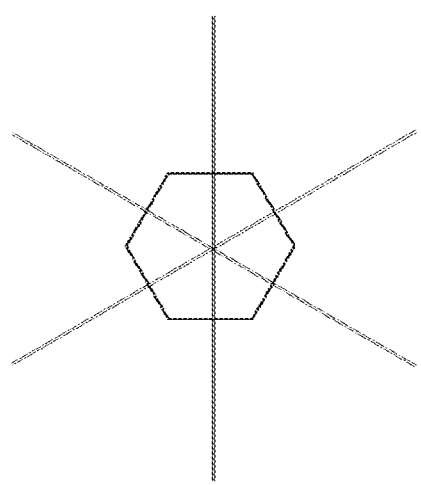
INCIDENT HOLE HAVING
ODD NUMBER OF SIDES
INCIDENT HOLE HAVING
EVEN NUMBER OF SIDES
FIG. 7A
FIG. 7B

APERTURE MODULE AND CAMERA MODULE INCLUDING THE SAME

CROSS-REFERENCE TO RELATED APPLICATION

This application claims the benefit under 35 USC 119(a) of Korean Patent Application No. 10-2019-0011428 filed on Jan. 29, 2019 in the Korean Intellectual Property Office, the entire disclosure of which is incorporated herein by reference for all purposes.

BACKGROUND

1. Field

The following description relates to an aperture module and a camera module including the same.

2. Description of Background

Camera modules have been standardly mounted in portable electronic devices such as smartphones, tablet PCs, laptop computers, and the like. A typical digital camera is provided with a mechanical aperture to adjust an amount of incident light according to a surrounding environment. However, a camera module, used in small products such as portable electronic devices, is difficult to provide with a separate aperture, due to structural characteristics and spatial limitations.

For example, due to various components configured to drive such an aperture, weight of a camera module may be increased, thereby deteriorating an autofocusing (AF) function or an optical image stabilization (OIS) function. In the case in which an aperture itself is provided with a power connection part configured to drive the aperture, such as coils or the like, such a power connection part may interfere with vertical movement of a lens when autofocusing is performed.

Additionally, there may be a need for functions to reduce the amount of current used and to precisely adjust an incident hole of an aperture module to various sizes.

Furthermore, there is need for a method of significantly reducing degradations in image quality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aperture module which may reduce the amount of current used and may continuously adjust a precise diameter of an aperture stop.

An aperture module which may significantly reduce light overlap, diffracted by a polygonal incident hole having an odd number of sides, to prevent degradation in image quality.

In one general aspect, an aperture module includes blades to form an incident hole having a variable size, a magnet portion including a driving magnet opposing a driving coil to allow the magnet portion to be linearly movable, and a rotation plate linked to the magnet portion and to the blades to convert linear motion of the magnet portion into rotational motion of the blades. The blades include a first blade having N sides (N being a positive integer) that form the incident hole, and a second blade having (N+1) sides that form the incident hole. The incident hole is in the form of a polygon having an odd number of sides.

The blades may include three or more blades.

Among the blades, at least one blade may have a shape different from a shape of each of the other blades.

Except for the at least one blade, the other blades may have a same shape.

The incident hole may form a regular polygon.

At least two of the blades may be a co-planar pair.

The blades may be provided as co-planar pairs in different planes.

Blades disposed in a same plane may mutually serve as stoppers.

The aperture module may include a position sensor to oppose the driving magnet.

Rotation shafts of the blades may form a non-regular polygon when connected to each other.

In another general aspect, an aperture module includes blades to form an incident hole having adjustable sizes, a magnet portion including a driving magnet opposing a driving coil to be linearly reciprocatable, and a rotation plate linked to the magnetic portion and to the blades to convert linear motion of the magnet portion into rotational motion of the blades. At least two of the blades are disposed side by side in a same plane.

The blades may include three or more blades.

The blades may be provided as co-planar pairs in different planes.

The incident hole may form a regular polygon having an odd number of sides.

Blades disposed in a same plane may mutually serve as stoppers.

In another general aspect, a camera module includes a housing, a lens module accommodated in the housing, and an aperture module having an even number of blades to form a variably-sized polygonal incident hole having an odd number of sides. Four sides of the housing, disposed parallel to an optical axis direction of the housing, are provided with a first optical image stabilization (OIS) driving coil, providing driving force in such a manner that the lens module is moved in a first direction, perpendicular to the optical axis direction, a second OIS driving coil, providing driving force in such a manner that the lens module is moved in a second direction, perpendicular to the optical axis direction and the first direction, an autofocusing (AF) driving coil, providing driving force in such a manner that the lens module is moved in the optical axis direction, and an aperture driving coil driving the blades.

Other features and aspects will be apparent from the following detailed description, the drawings, and the claims.

BRIEF DESCRIPTION OF DRAWINGS

FIGS. 7A and 7B are reference diagrams illustrating an effect of an incident hole implemented by an aperture module according to an example.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
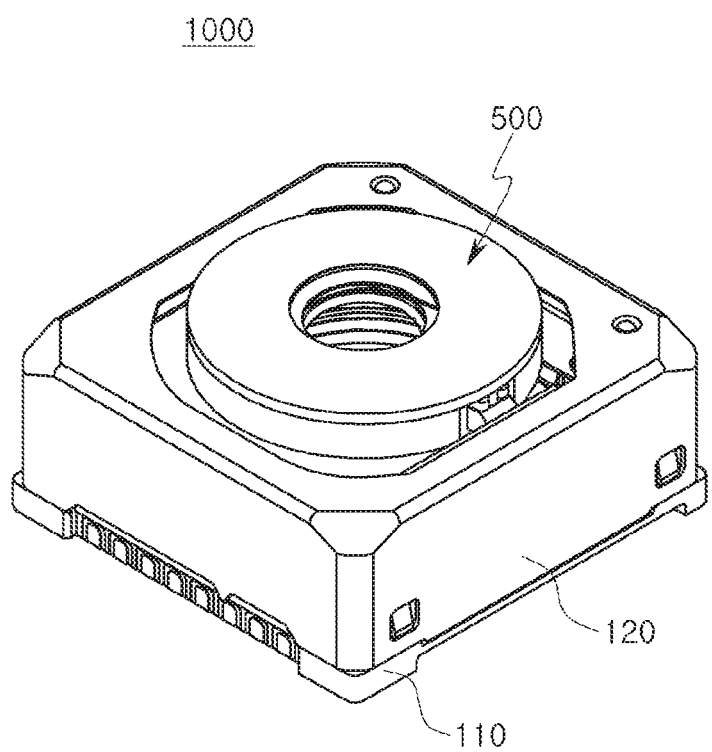
FIG. 1 is a perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described in detail with reference to the accompanying drawings.

A camera module according to the examples may be mounted in a portable electronic device such as a mobile communications terminal, a smartphone, a tablet personal computer (PC), or the like.

Figure 2:
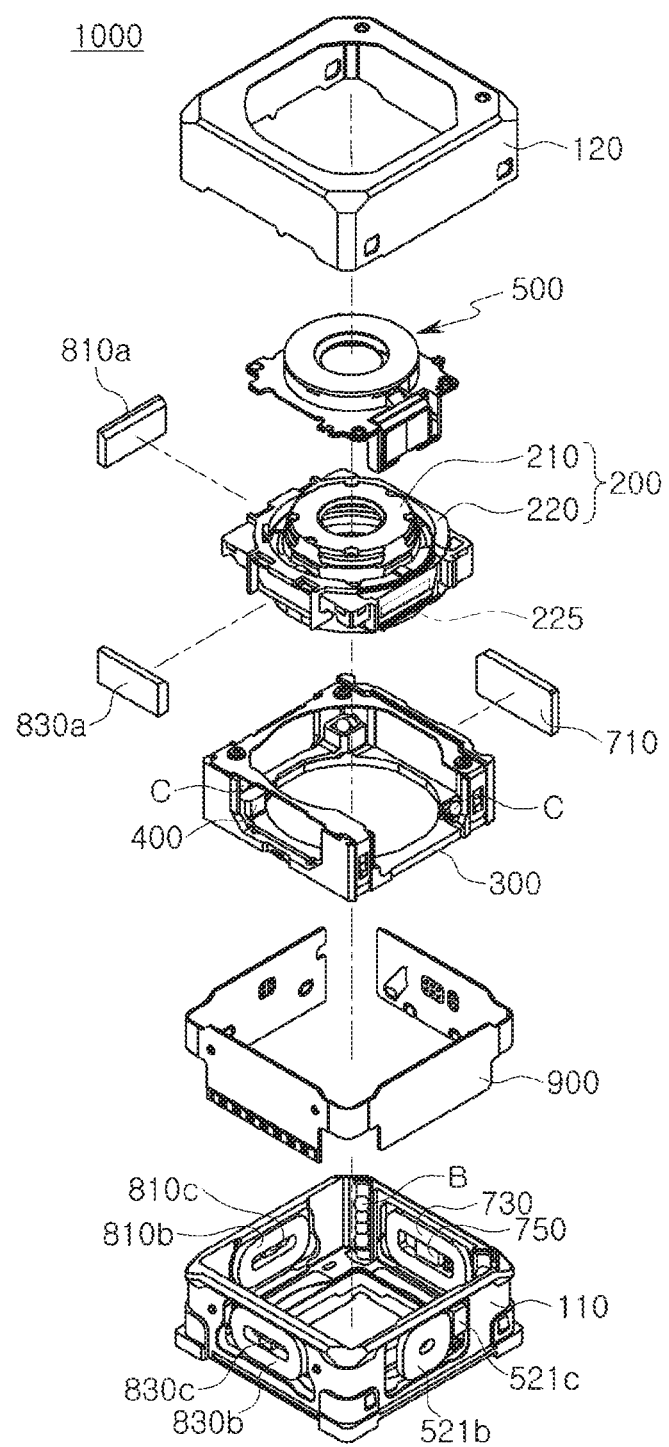
FIG. 2 is an exploded perspective view of a camera module according to an example.
Figure 3A:
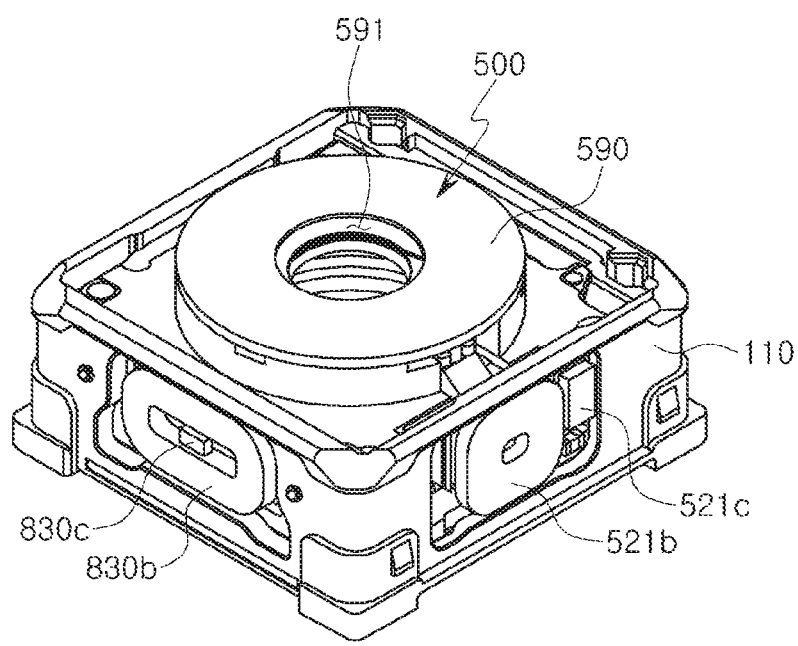
FIG. 3A is a perspective view of a portion of a camera module according to an example.
Figure 3B:
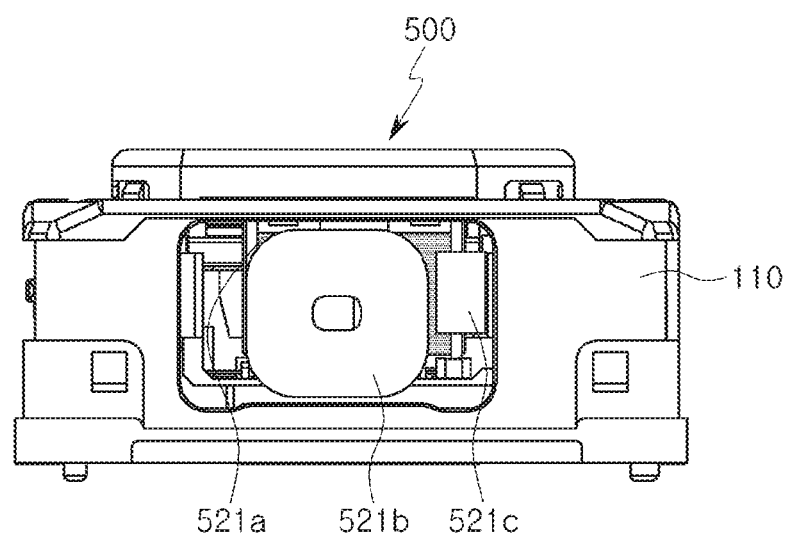
FIG. 3B is a side view of the camera module illustrated in FIG. 3A.

FIG. 1 is a perspective view of a camera module according to an example, and FIG. 2 is an exploded perspective view of a camera module according to an example. FIG. 3A is a perspective view of a portion of a camera module according to an example, and FIG. 3B is a side view of FIG. 3A.

Referring to FIGS. 1 to 3B, a camera module 1000 may include a lens module 200, a carrier 300, a guide portion 400, an aperture module 500, a housing 110, and a case 120.

The lens module 200 may include a lens barrel 210, including a plurality of lenses capturing a subject, and a holder 220 accommodating the lens barrel 210. The plurality of lenses may be disposed in the lens barrel 210. The lens module 200 may be accommodated in the carrier 300.

The lens module 200 may be configured to be movable in an optical axis direction for focusing. As an example, the lens module 200 may be moved in the optical axis direction together with the carrier 300 by a focusing portion.

The focusing portion may include a magnet 710 and a coil 730 generating driving force in the optical axis direction. In addition, the camera module 1000 may include a position sensor 750, for example, a Hall sensor, to sense a position of the lens module 200, for example, the carrier 300 in the optical axis direction.

The magnet 710 may be mounted on the carrier 300. As an example, the magnet 710 may be mounted on one surface of the carrier 300.

The coil (AF driving coil) 730 and the position sensor 750 may be mounted in the housing 110. As an example, the coil 730 and the position sensor 750 may be fixed to the housing 110 to face the magnet 710. The coil 730 and the position sensor 750 may be provided on a substrate 900, and the substrate 900 may be mounted in the housing 110.

The magnet 710 may be a movable member, mounted on the carrier 300 to move in the optical axis direction together with the carrier 300, and the coil 730 and the position sensor 750 may be fixed members that are fixed to the housing 110.

When power is applied to the coil 730, the carrier 300 may be moved in the optical axis direction by electromagnetic interaction between the magnet 710 and the coil 730. In addition, the position sensor 750 may sense a position of the carrier 300 in the optical axis direction.

Since the lens module 200 is accommodated in the carrier 300, the lens module 200 may also be moved in the optical axis direction together with the carrier 300 by the movement of the carrier 300.

The aperture module 500, mounted on the lens module 200, may also be moved in the optical axis direction together with the lens module.

A rolling member B may be disposed between the carrier 300 and the housing 110 to reduce friction between the carrier 300 and the housing 110 when the carrier 300 is moved. The rolling member B may have a ball shape.

The rolling member B is disposed on both sides of the magnet 710 (or the coil 730).

A yoke may be mounted on the substrate 900. As an example, the yoke and the magnet 710 may be disposed to face each other with the coil 730 interposed therebetween.

Attractive force may act between the yoke and the magnet 710 in a direction perpendicular to the optical axis direction.

Accordingly, the rolling member B may be maintained in a state of contact with the carrier 300 and the housing 110 by the attractive force between the yoke and the magnet 710.

In addition, the yoke may serve to focus magnetic force of the magnet 710. Accordingly, generation of a leakage flux may be prevented.

As an example, the yoke and the magnet 710 may form a magnetic circuit.

To correct image shaking caused by user's handshaking or the like, the lens module 200 may be moved in a first direction, perpendicular to an optical axis, and a second direction, perpendicular to the optical axis and the first direction.

For example, a shaking correction portion may provide a relative displacement, corresponding to shaking, to the lens module 200 to compensate for the shaking when the shaking occurs due to user's handshaking or the like during image capturing.

The guide portion 400 may be accommodated in the carrier 300 and may be mounted on an upper portion of the carrier 300 in the optical axis direction. The holder 220 may be mounted on the guide portion 400. A ball member C, serving as a rolling bearing, may be provided between the carrier 300 and the guide portion 400 in the optical axis direction and between the guide portion 400 and the holder 220 in the optical axis direction.

The guide portion 400 may be configured to guide the lens module 200 when the lens module 200 is moved in the first and second directions perpendicular to the optical axis.

As an example, the lens module 200 may be relatively moved in the first direction with respect to the guide portion 400, and the guide portion 400 and the lens module 200 may be moved together within the carrier 300 in the second direction.

The shaking correction portion may include magnets 810*a* and 830*a* and coils (a first OIS driving coil and a second OIS driving coil) 810*b* and 830*b*. The shaking correction portion may include position sensors 810*c* and 830*c*, for example, Hall sensors, to sense positions of the lens module 200 in the first direction and the second direction.

Among the magnets 810*a* and 830*a* and the coils 810*b* and 830*b*, one magnet 810*a* and one coil 810*b* may be disposed to face each other in the first direction to generate driving force in the first direction, and the other magnet 830*a* and the other coil 830*b* may be disposed to face each other in the second direction to generate driving force in the second direction.

The magnets 810*a* and 830*a* may be mounted on the lens module 200, and the coils 810*b* and 830*b* and the position sensors 810*c* and 830*c* facing the magnets 810*a* and 830*a* may be fixed to the housing 110. As an example, the coils 810*b* and 830*b* and the position sensors 810*c* and 830*c* may be provided with the substrate 900 and the substrate 900 may be mounted on the housing 110.

The magnets 810*a* and 830*a* may be movable members moved together with the lens module 200 in the first direction and the second direction, and the coils 810*b* and 830*b* and the position sensors 810*c* and 830*c* may be fixed members that are fixed to the housing 110.

Ball members C may be provided to support the guide portion 400 and the lens module 200. The ball members C may serve to guide the guide portion 400 and the lens module 200 during shaking correction.

The ball members C may be provided between the carrier 300 and the guide portion 400, between the carrier 300 and the lens module 200, and between the guide portion 400 and the lens module 200.

When driving force is generated in the first direction, the ball members C, disposed between the carrier 300 and the guide portion 400 and between the carrier 300 and the lens module 200, may roll in the first direction. Accordingly, the ball members C may guide the movement of the guide portion 400 and the lens module 200 in the first direction.

When the driving force is generated in the second direction, the ball members C, disposed between the guide portion 400 and the lens module 200 and between the carrier 300 and the lens module 200, may roll in the second direction. Accordingly, the ball members C may guide the movement of the lens module 200 in the second direction.

The lens module 200 and the carrier 300 may be accommodated in the housing 110. As an example, the housing 110 may be in the form of a substantial square box having open top and open bottom, and may be provided with an internal space in which the lens module 200 and the carrier 300 are accommodated.

A printed circuit board (PCB) may be disposed below the housing 110.

The case 120 may be coupled to the housing 110 to surround external surfaces of the housing 110, and may serve to protect internal components of the camera module 1000. In addition, the case 120 may serve to shield electromagnetic waves.

As an example, the case 120 may shield electromagnetic waves generated from the camera module 1000 in such a manner that the electromagnetic waves do not affect other electronic components in the portable electronic device.

Since various electronic components as well as the camera module 1000 are mounted in the portable electronic device, the case 120 may shield electromagnetic waves generated from such electronic components in such a manner that the electromagnetic waves do not affect the camera module 1000.

The case 120 may be formed of a metal to be grounded to a ground pad provided on the printed circuit board. Thus, the case 120 may shield electromagnetic waves.

The aperture module 500 may be configured to selectively change an amount of light incident on the lens module 200.

As an example, the aperture modules 500 may be provided with a plurality of blades by which incident holes, having different sizes to each other, may be continuously implemented. Light may be incident through one of the incident holes, having different sizes to each other, depending on a capturing environment.

An aperture module 500 may be coupled to a lens module 200 and may be configured to selectively change the amount of light incident on the lens module 200.

Since the aperture module 500 may allow a relatively small amount of light to be incident on the lens module 200 in a high illumination environment and may allow a relatively large amount of light to be incident on the lens module 200 in a low illumination environment, the aperture module 500 may constantly maintain image quality even in various illumination conditions.

The aperture module 500 may be coupled to the lens module 200 to be moved together with the lens module 200 in an optical axis direction, a first direction, and a second direction. For example, the lens module 200 and the aperture module 500 may be moved together during focusing and shaking correction such that a distance between the lens module 200 and the aperture module 500 is not changed.

Figure 4:
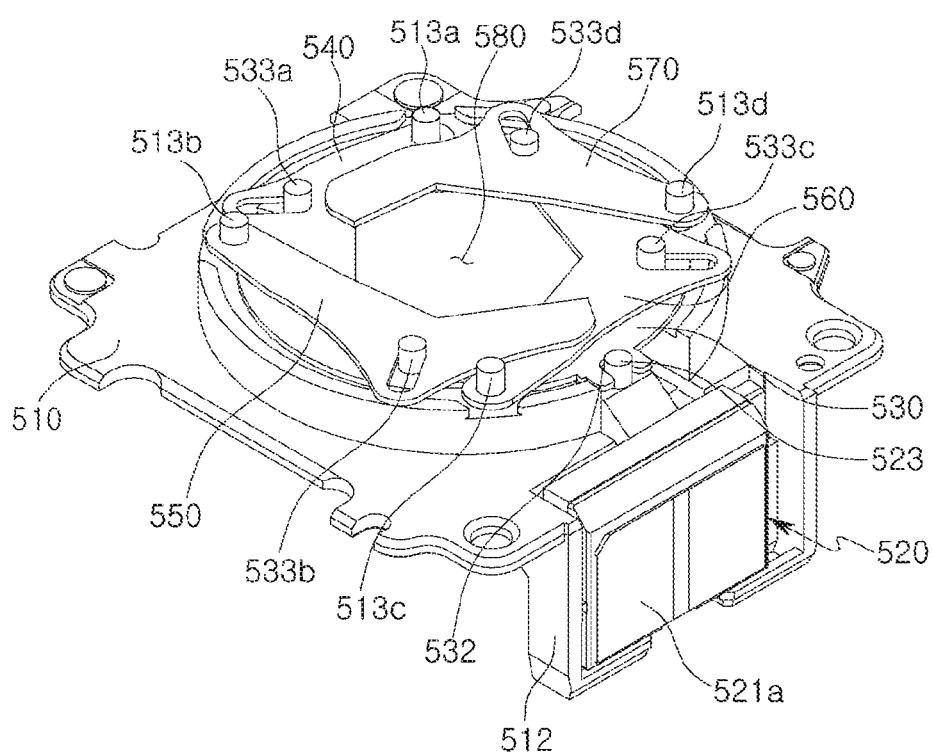
FIG. 4 is a coupled perspective view of an aperture module, with a cover removed, according to an example.
Figure 5:
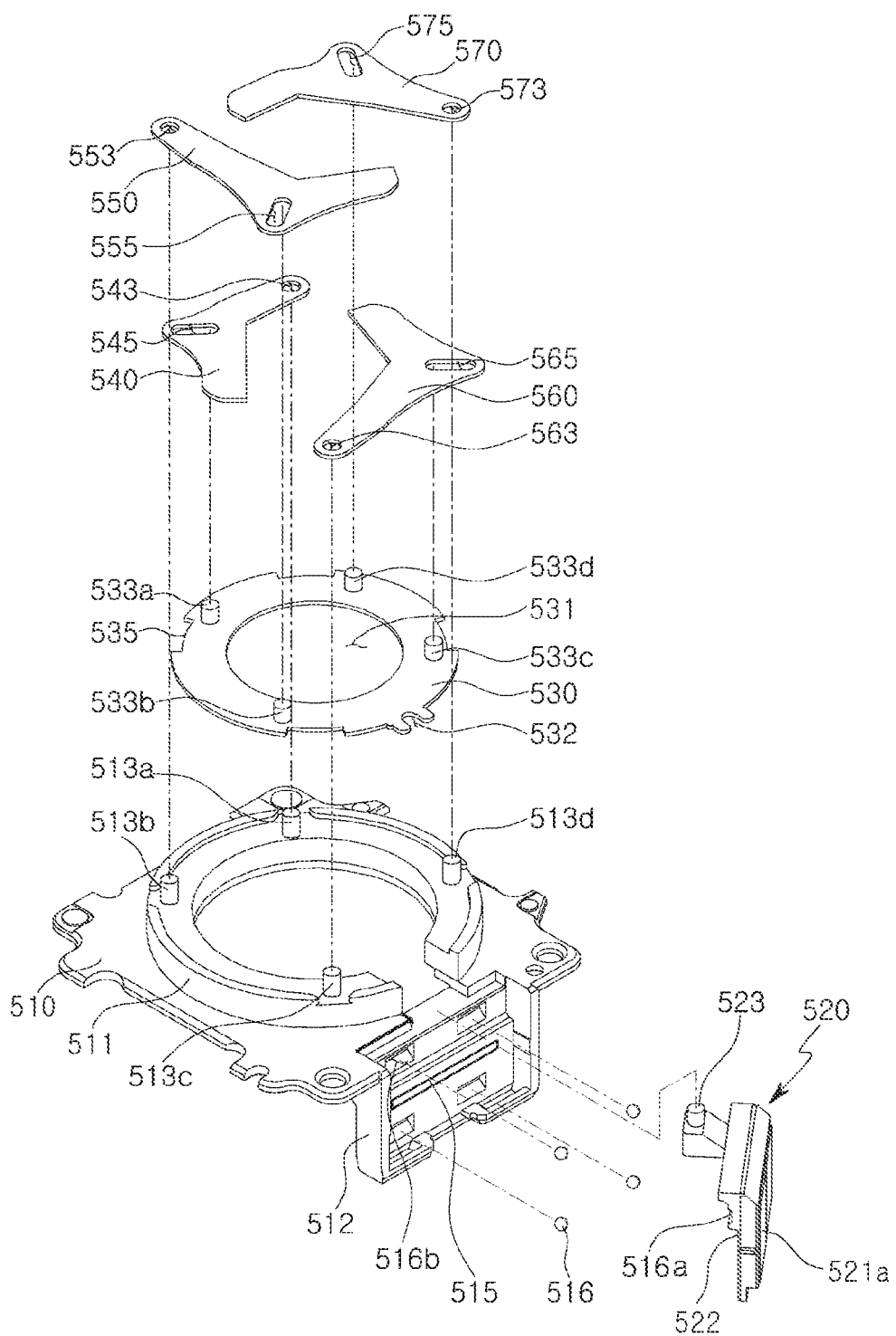
FIG. 5 is an exploded perspective view of an aperture module, with a cover removed, according to an example.

FIG. 4 is a coupled perspective view of an aperture module according to an example, and FIG. 5 is an exploded perspective view of blades and rotation plates provided in the aperture module.

Referring to FIGS. 4 and 5, the aperture module 500 includes a base 510, a plurality of blades 540, 550, 560, and 570, and an aperture driving portion (including a moving portion 520, including a driving magnet 521a, and a driving coil 521b (see FIGS. 2, 3A, and 3B)). The aperture module 500 may include a position sensor (a Hall sensor) 521c (see FIGS. 2, 3A, and 3B) which may precisely determine a position of the moving portion 520 to perform closed-loop control. The aperture module 500 may include a cover 590 (see FIG. 3A) covering the base 510 and the plurality of blades 540, 550, 560, and 570 and having a through-hole 591 (see FIG. 3A) through which light is incident.

The aperture module 500 includes, for example, blades 540, 550, 560, and 570. Although four blades are illustrated in the drawings, the present example is not limited thereto and may be applied to all cases in which three or more blades are provided.

Each of the first to fourth blades 540, 550, 560, and 570 may be provided in a substantial boomerang shape, and may have an internal side portion forming an incident hole 580 and having a linear ("-") shape or a bent ("V") shape. For example, as illustrated in the drawings, an internal side portion of the first blade 540 has a linear ("-") shape and an overall internal side portion may seem to be a V shape, but a portion, contributing to formation of the incident hole 580, may have a linear ("-") shape (each of second to fourth blades 550, 560, and 570 may have an V-shaped internal side portion).

Among the blades 540, 550, 560, and 570, one blade may have a shape different from shapes of the other blades, and the other blades may have the same shape as each other for ease of manufacturing thereof.

In the case in which at least one of the blades 540, 550, 560, and 570 has an internal side portion having a linear ("-") shape (an overall internal side shape may seem to be a V shape but a portion, contributing to formation of the incident hole 580, may have a linear ("-") shape) while each of the other blades has a V-shaped internal side portion, the blades may have the same shape or different shapes to each other. For example, in the case of the first to fourth blades 540, 550, 560, and 570, they are provided in three shapes, and the second and fourth blades 550 and 570 have the same shape. This is aimed at allowing blades, provided at the same level, to mutually serve as stoppers, which will be described below. In the present example, the fourth blade 570 may be locked by the second blade 550, provided at the same level as the fourth blade 570, to serve as a stopper, as illustrated in FIG. 9C.

A polygonal incident hole 580, having an odd number of sides, may be implemented by a combination of internal side portions of the first to fourth blades 540, 550, 560, and 570. The incident hole 580 may be in the form of a polygon having an odd number of sides.

For example, the aperture module 500 may be provided with polygonal (regular polygonal) incident holes 580, having various sizes, continuously or intermittently disposed by a combination of an even number of blades.

Figure 6A:
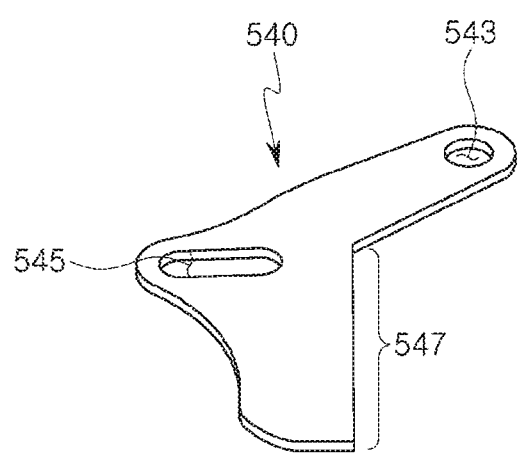
FIGS. 6A and 6B illustrate an example of a blade provided in an aperture module according to an example.
Figure 6B:
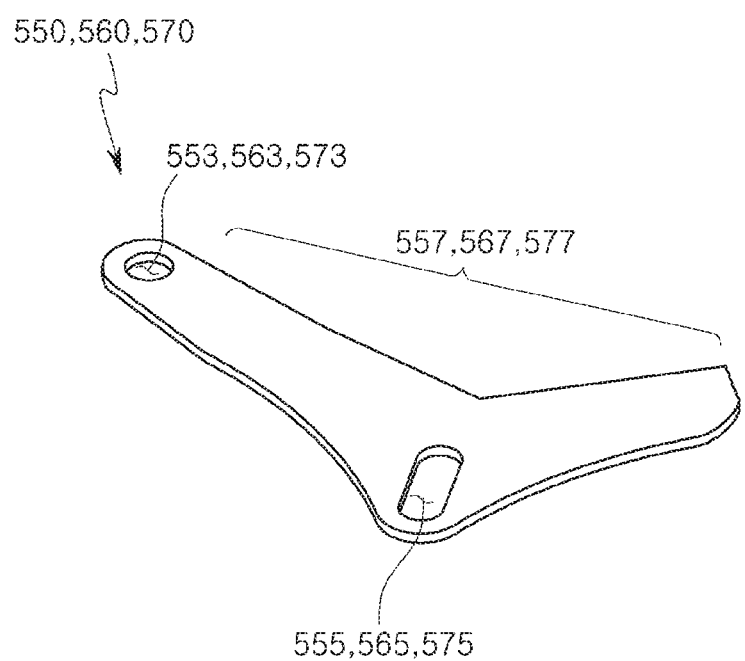

Among the plurality of blades 540, 550, 560, and 570, one blade may have an internal side surface 547, contributing to formation of an incident hole 580, having a linear ("-") shape (see FIG. 6A), and the other blades may have internal side portions 557, 567, and 577, contributing to formation of an incident hole 580, having a bent ("V") shape (see FIG. 6B).

A heptagonal (or regular heptagonal) incident hole 580 may be implemented by a combination of the linear internal side portions 547 of the first to fourth blades 540, 550, 560, and 570 and bent internal side portions 557, 567, and 577 thereof. In addition, the incident hole 580 may maintain a heptagonal (or regular heptagonal) shape while continuously (or intermittently) changing in size.

A shape of the incident hole 580 is not limited thereto, and three or more blades may be provided and combined to implement various incident holes, each having an odd number of sides, such as a pentagonal shape implemented by three blades, a nonagonal shape implemented by five blades, or the like.

For example, although not illustrated in the drawings, a plurality of blades includes blades, providing N sides (N being a positive integer) to form an incident hole 580, and a blade having (N+1) sides to form an incident hole 580. The incident hole 580, formed by the plurality of blades, may include all polygonal incident holes, each having an odd number of sides. A case, in which N is '1', is illustrated in the drawings, and all cases, in which N is '2' or more, may be included in the present example. All structures, in the case in which N is '2' or more, may also be included in the present example. In the case in which N is '2' or more, an example, in which each blade, having a shape of being bent twice or more times, provides three or more sides to form an incident hole 580, is also possible.

Since the first to fourth blades 540, 550, 560, and 570 are slidably moved while portions thereof are in contact with each other, the first to fourth blades 540, 550, 560, and 570 may be antistatically treated to prevent generation of frictional electricity.

The first to fourth blades 540, 550, 560, and 570 may be arranged in pairs on the same plane side by side. For example, the first and third blades 540 and 560 may be provided on a lower layer (co-planar), while the second and fourth blades 550 and 570 may be provided on an upper layer (co-planar, see FIG. 4). In this case, blades provided on the same layer, may mutually serve as stoppers (see FIG. 9C in which the fourth blade 570 is locked by the second blade 550). Since a plurality of blades are provided on the same layer without sequentially forming a multilayer structure, an overall thickness of the blades may be reduced to implement an aperture module having a reduced thickness.

In the case in which the blades are provided in an even number, two of the blades are provided in pairs on a single layer. Meanwhile, in the case in which the blades are provided in an odd number, a certain blade may be solely provided to form a single layer.

Referring to FIGS. 7A and 7B, image quality of a camera module may be significantly improved more when an incident hole 580, formed by combining a plurality of blades, is in the form of a polygon having an odd number of sides, as compared to when an incident hole 580 is in the form of a polygon having an even number of sides.

As illustrated in FIG. 7A, since sides of an incident hole having an odd number of sides do not face each other, lights, diffracted on the sides of the incident hole, do not overlap each other, and thus may have no effect on degradation in image quality.

Meanwhile, as illustrated in FIG. 7B, since sides of an incident hole having an even number of sides face each other, lights may overlap each other to have an adverse effect on image quality when the lights are simultaneously diffracted on sides facing each other.

As a result, an incident hole having an odd number of sides may be implemented to significantly reduce degradation in image quality caused by an aperture module.

The first to fourth blades 540, 550, 560, and 570 are linked to a rotation plate 530 to be driven. However, this is merely an example. Although not in the drawings, the first to fourth blades 540, 550, 560, and 570 may be directly connected to the driving portion, to be driven. The first to fourth blades 540, 550, 560, and 570 may be directly linked to the moving portion 520, a driving portion, or may be indirectly linked to the moving portion 520 via the rotation plate 530.

The rotation plate 530 may be linked to the moving portion 520, linearly reciprocating in a direction perpendicular to the optical axis direction, and may be rotated about the optical axis by converting a linear motion of the moving portion 520 into rotational motion. A center of the rotation plate 530 may be provided with a through-hole 531 through which light passes, and the through-hole 531 may have a size equal to or greater or smaller than a size of a maximum-sized incident hole formed by the first to fourth blades 540, 550, 560, and 570. Since the rotation plate 530 is brought into contact with the first to fourth blades 540, 550, 560, and 570, the rotation plate 530 may be antistatically treated to prevent generation of frictional electricity.

The base 510 may be provided with a guide groove 511 to guide a rotational motion of the rotation plate 530, and the rotation plate 530 may be inserted into the guide groove 511 to be rotated while being guided. The rotation plate 530 may have a circular edge (an edge of the rotation plate 530 may be provided with a predetermined groove (an avoidance groove) 535 to interfere with stationary shafts 513a, 513b, 513c, and 513d, adjacent members). The guide groove 511 may also have a circular edge to correspond to the rotation plate 530 (the edge of the guide groove 511 may be provided with stationary shafts 513a, 513b, 513c, and 513d, slightly inwardly inserted, and the like).

Even in a case in which the base 510 is not provided with the guide groove 511, a rotation may be naturally induced because driving shafts 533a, 533b, 533c, and 533d of the rotation plate 530 are inserted into the four blades 540, 550, 560, and 570, respectively.

The first to fourth blades 540, 550, 560, and 570 may be driven in linkage with the rotation plate 530 when the rotation plate 530 is rotating.

The first to fourth blades 540, 550, 560, and 570 may be provided with rotation shaft holes 543, 553, 563, and 573 and driving shaft holes 545, 555, 565, and 575, respectively. The rotation shaft holes 543, 553, 563, and 573 may be rotatably fitted in the stationary shafts 513a, 513b, 513c, and 513d, respectively. The driving shaft holes 545, 555, 565, and 575 may be rotatably and movably fitted in the driving shafts 533a, 533b, 533c, and 533d of the rotation plate 530, respectively.

The rotation shaft holes 543, 553, 563, and 573, the driving shaft holes 545, 555, 565, and 575, and a guide hole 532, fitted in the projection-shaped stationary shafts 513a, 513b, 513c, and 513d, the driving shafts 533a, 533b, 533c, and 533d, and a driving projection 523 to transfer force or to form a rotation shaft, may have hole shapes or groove shapes although a word 'hole' is included in respective names thereof for ease of description. Additionally, the above-mentioned holes will be used interchangeably with stationary shaft inserting portion 543, 553, 563, and 573, driving shaft inserting portions 545, 555, 565, and 575, and a driving projection inserting portion 532.

Since the rotation shaft holes 543, 553, 563, and 573 of the first to fourth blades 540, 550, 560, and 570 are provided in a circular shape, rotation is possible only while the rotation shaft holes 543, 553, 563, and 573 are fitted in the stationary shafts 513a, 513b, 513c, and 513d.

The driving shaft holes 545, 555, 565, and 575 may be elongated to allow the driving shafts 533a, 533b, 533c, and 533d to be movable while being fitted in the driving shafts 533a, 533b, 533c, and 533d. The driving shaft holes 545, 555, 565, 575 may be inclined in a rotation direction of the rotation plate 530. Among the first to fourth blades 540, 550, 560, and 570, the first blade 540 provides only one side to form the incident hole 580. The driving shaft hole 545 of the first blade 540 may have a degree of inclination to the rotation direction of the rotation plate 530 different from degrees of inclination of the other blades 550, 560, and 570.

As the rotation plate 530 is rotated, the driving shafts 533a, 533b, 533c, and 533d may be rotated and the driving shafts 533a, 533b, 533c, and 533d, fitted in the driving holes 545, 555, 565, and 575 of the first to fourth blades 540, 550, 560, and 570, may be moved. Thus, the first to fourth blades 540, 550, 560, and 570 may be inwardly contracted or outwardly extended to implement incident holes, having various sizes, in multiple stages or continuously.

In the present example, the first to fourth blades 540, 550, 560, and 570 are linked to the rotation plate 530. Therefore, when the moving portion 520 is linearly moved by an electromagnetic interaction between the driving magnet 521a and the driving coil 521b, the rotation plate 530 may be rotated. As a result, the first to fourth blades 540, 550, 560, and 570 may be moved to change a diameter of an aperture stop.

Figure 8:
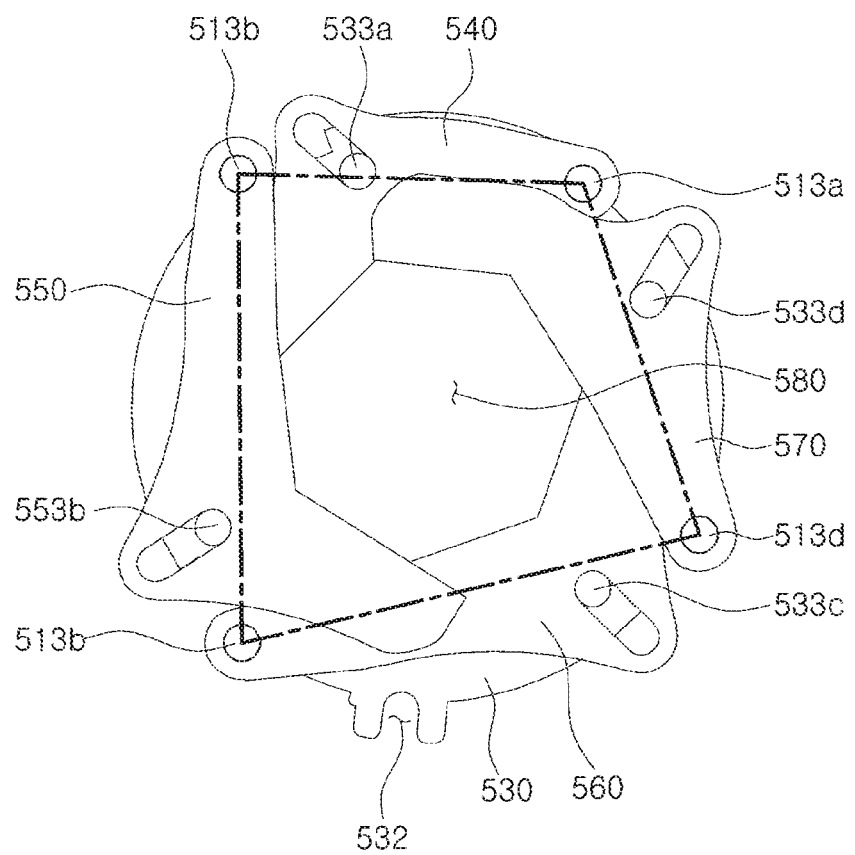
FIG. 8 is a reference view illustrating a positional relationship of rotating shafts of a plurality of blades provided in an aperture module according to an example.

The stationary shafts 513a, 513b, 513c, and 513d of the base 510 may be provided in the same number as the blades 540, 550, 560, and 570. Since one blade having a different number of blades, involved in implementing the incident hole 580, and the other blades are included, the stationary shafts 513a, 513b, 513c, and 513d may be sequentially connected to form a regular polygon (see FIG. 8). In the present example, since four blades are used, rotation shafts of the blades may be connected to form a tetragon rather than a square.

In view of the fact that at least one of the four blades, forming the incident hole 580, is different in shape, rotation angels of one blade, a different number (shape) of sides involved in implementing the incident hole 580, and the other blades may be interlinked to be different from each other.

An aperture driving portion includes the moving portion 520, disposed to be movable in one axis, including the magnet 521a and the driving coil 521b fixed to the housing 110 to oppose the magnet 521a.

The driving coil 521b is provided at the substrate 900, and the substrate 900 is fixed to the housing 110. The substrate 900 may be electrically connected to a printed circuit board (PCB) attached to a bottom surface of the camera module 1000.

The moving portion 520 may be a movable member moving in an optical axis direction, a first direction, and a second direction together with the base 510, while the driving coil 521b may be a fixed member that is fixed to the housing 110.

Since the driving coil 521b, providing driving force to the aperture module 500, is disposed outside the aperture module 500, for example, in the housing 110 of the camera module 1000, weight of the aperture module 500 may be decreased.

For example, since the driving coil 521b, providing driving force to the aperture module 500, is provided as a fixed member, a coil is not moved when an autofocusing (AF) or optical image stabilization (OIS) function is performed. Thus, an increase in weight of lens module 200, caused by employment of the aperture module 500, may be significantly reduced.

Since the driving coil 521b, providing driving force to the aperture module 500, is disposed in the housing 110, a fixing member, to be electrically connected to the PCB, the coil of an aperture driving portion is not affected although a lens module 200 and the aperture module 500 are moved when the AF or OIS function is performed.

As a result, degradation in the AF function may be prevented.

In the present example, since a size of the incident hole 580 may be continuously changed, a position of the moving portion 520 needs to be precisely sensed to precisely implement the size of the incident hole 580. Accordingly, the position sensor 521c, disposed to oppose the driving magnet 521a of the moving portion 520, may be provided to determine a position of the driving magnet 521a. The position sensor 521c may be a Hall sensor and may be mounted in the center of or adjacent to the driving coil 521b. For example, the position sensor 521c may be provided together with the substrate 900 provided with the driving coil 521b.

In the present example, when the moving portion 520 is linearly moved, a closed-loop control manner is used to sense and feed back a position of the moving portion 520. Hence, the position sensor 521c is required for closed-loop control.

The substrate 900 may be provided with a gyrosensor, not illustrated, configured to detect shaking factors such as user's handshaking and the like, and a driver integration circuit (IC), not illustrated, configured to provide a driving signal to coils 810b, 830b, 730, and 521b.

The base 510 is provided with a moving guide 512 in which the moving portion 520 is disposed. The moving guide 512 may have a shape extending from the base 510 in an optical axis direction.

The moving portion 520 includes the driving magnet 521a, disposed to face the driving coil 521b, and a magnet holder 522 to which the driving magnet 521a is coupled. The driving magnet 521a is disposed to oppose the driving coil 521b in a direction perpendicular to the driving coil 521b.

The moving portion 520 may be moved in a tight contact with the moving guide 512 of the base 510. Accordingly, the moving guide 512 may be provided with a yoke 515 in such a manner that the moving portion 520 is brought into tight contact with the moving guide 512 by frictional force with the driving magnet 521a of the moving portion 520. The yoke 515 may be provided in a position corresponding to the moving portion 520 of the lens module 200. The moving portion 520 may be slidably moved, while maintaining a state of tight contact with the moving guide 512, by frictional forces between the yoke 515 and the driving magnet 521a.

The base 510 may be provided with a bearing to allow the moving portion 520 to be easily slidably moved. For example, as illustrated in FIG. 5, a ball bearing 516 may be provided between the moving portion 520 and the moving guide 512, and the moving portion 520 and the moving guide 512 may be respectively provided with seating grooves 516a and 516b in which the ball bearing 516 is selectively seated. The bearing is not limited to a ball bearing, and may be in the form of, for example, a rod or a plate which is easily slidably moved.

When power is applied to the driving coil 521b, the moving portion 520 may be moved in a direction perpendicular to the optical axis direction by electromagnetic interaction between the driving magnet 521a and the driving coil 521b.

The base 510 may be provided with the guide groove 511 to guide a rotational motion of the rotation plate 530, and the rotation plate 530 may be inserted into the guide groove 511 to be rotated while being guided.

The rotation plate 530 may be provided with a guide hole 532 elongated in one direction. The guide hole 532 may be provided to be elongated in the moving direction of the moving portion 520. The guide hole 532 may be in the form of a hole or a groove. As illustrated in the drawings, the guide hole 532 is in the form of a groove having one open side.

Figure 9A:
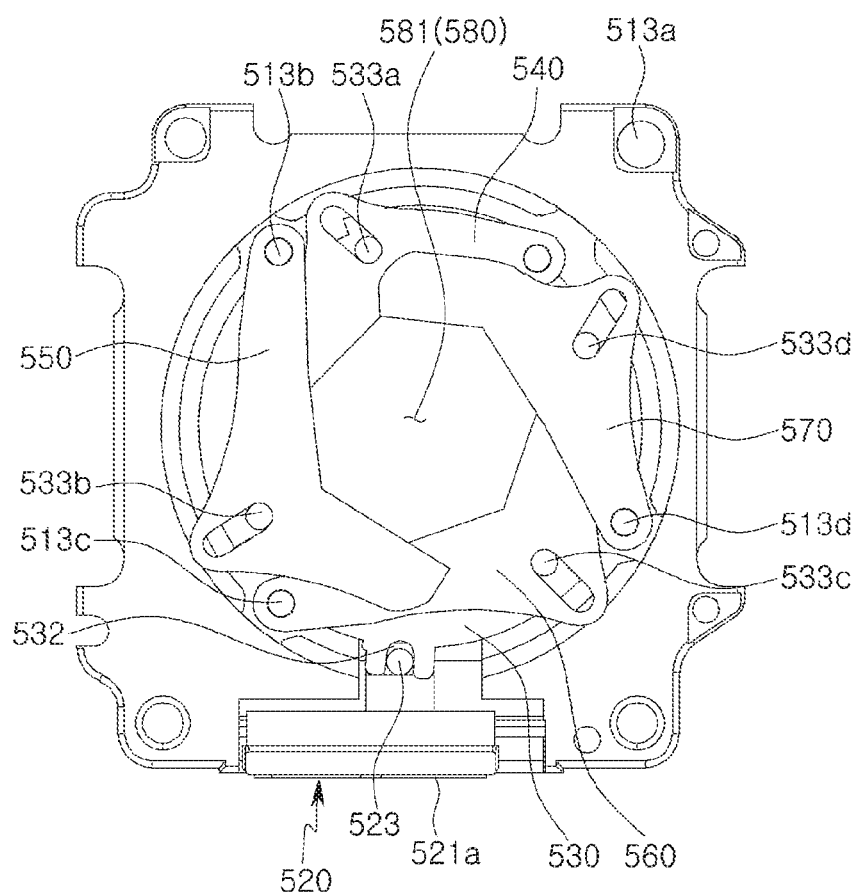
FIGS. 9A, 9B, and 9C are plan views illustrating an aperture module driven to change a size of an incident hole.
Figure 9B:
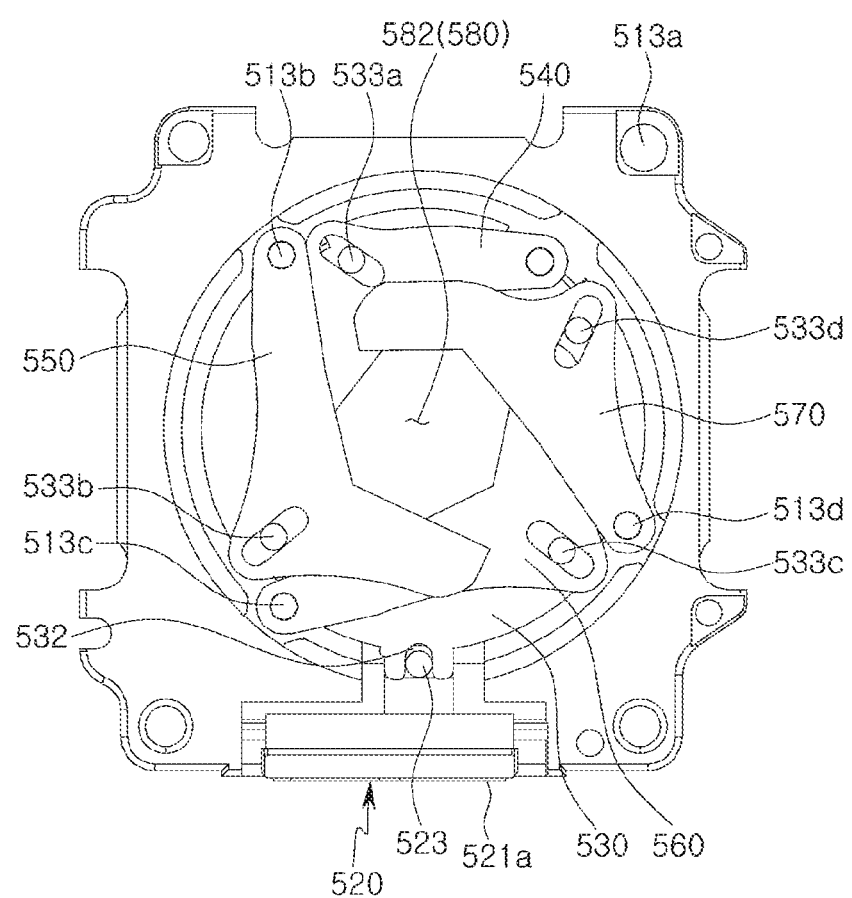
Figure 9C:
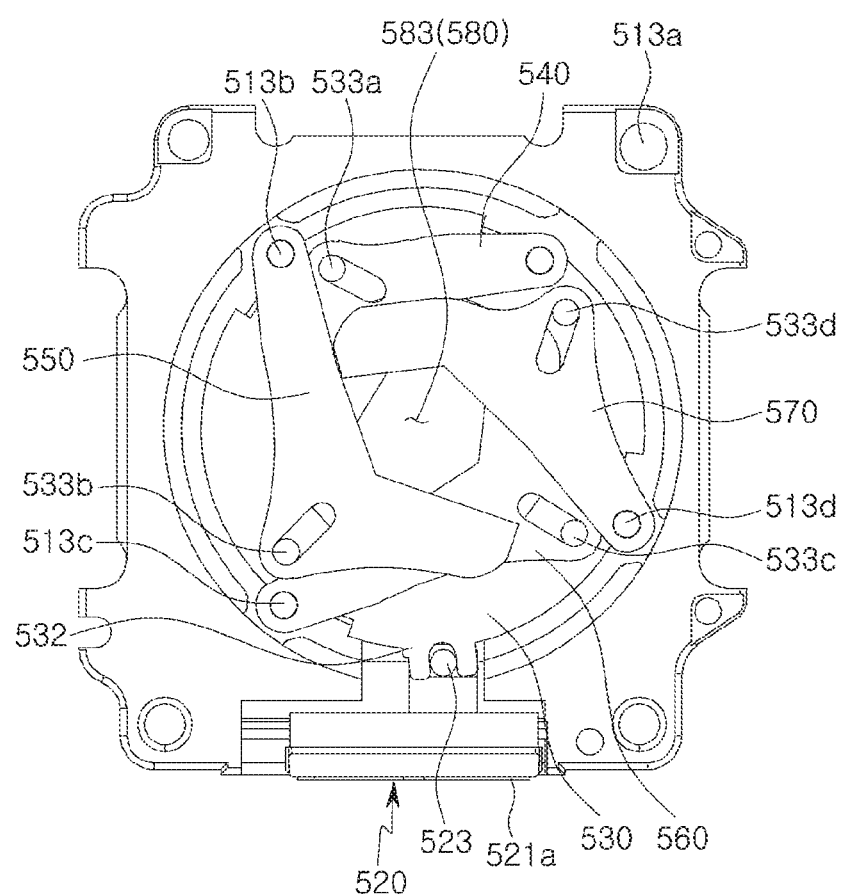

Accordingly, when the moving portion 520 is moved along one axis, a driving projection 523, provided on the moving portion 520, may be moved within the guide hole 532, the rotation plate 530 may be rotated in the guide grove 511 according to the movement of the driving projection 523, and a size of the incident hole 580 may be changed in multiple stages or continuously while first to fourth blades 540, 550, 560, and 570, linked to the rotation plate 530, are contracted or extended (see FIGS. 9A to 9C).

FIGS. 9A to 9C are plan views illustrating that an aperture module is driven while a size of an incident hole is changed in multiple stages or continuously.

Referring to FIG. 9A, when the moving portion 520 is disposed at an end portion of one side, a largest-sized incident hole 581 may be implemented by the first to fourth blades 540, 550, 560, and 570.

Referring to FIG. 9B, when the moving portion 520 is moved from an end portion of one side to the other side by a predetermined distance (the moving portion 520 is moved in a halfway position), the first to fourth blades 540, 550, 560, and 570 may be rotated to implement a medium-sized incident hole 582.

Referring to FIG. 9C, when the moving portion 520 is moved to an end portion of one side, disposed to oppose the other side, by driving an aperture driving portion, the first to fourth blades 540, 550, 560, and 570 may be rotated to implement a smallest-sized incident hole 583.

As described above with reference to FIGS. 9A to 9C, when the moving portion 520 returns to an end portion of one side after moving from the end portion of one side to an end portion of the other side, small sizes of the incident holes 582 and 583 may be changed to a largest size of the incident hole 581.

In addition, when the moving portion 520 is moved between an end portion of one end and an end portion of the other side, various random-sized incident holes, each having a medium size between a size of the largest-sized incident hole 581 and a size of the smallest-sized incident hole 583, may be implemented by the first to fourth blades 540, 550, 560, and 570.

As described above, the aperture module 500 according to the present example may continuously implement various-sized incident holes due to a linear reciprocating motion of the moving portion 520.

According to the above-described examples, a camera module according to an example may selectively change the amount of incident light through an aperture module, may prevent deterioration of autofocusing (AF) performance even when an aperture module is mounted, and may significantly reduce an increase in weight caused by employment of an aperture module. Moreover, the camera module may decrease a thickness of the aperture module, and may significantly reduce degradation in image quality caused by diffraction of light.

As described, an aperture module, capable of continuously implementing a precise diameter of an aperture stop while reducing use of current, may be provided.

Moreover, the overlap of diffracted lights may be significantly reduced to effectively prevent degradation in image quality.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An aperture module comprising:
   blades configured to form an incident hole having a variable size;
   a magnet portion comprising a driving magnet opposing a driving coil and configured to be linearly movable; and
   a rotation plate linked to the magnet portion and to the blades, and configured to convert linear motion of the magnet portion into rotational motion of the blades,
   wherein the blades comprise a first blade having N sides (N being a positive integer) that form the incident hole and a second blade having (N+1) sides that form the incident hole, and
   the incident hole is in the form of a polygon having an odd number of sides.

2. The aperture module of claim 1, wherein the blades comprise three or more blades.

3. The aperture module of claim 1, wherein among the blades, at least one blade has a shape different from a shape of each of the other blades.

4. The aperture module of claim 3, wherein except for the at least one blade, the other blades have a same shape.

5. The aperture module of claim 1, wherein the incident hole forms a regular polygon.

6. The aperture module of claim 2, wherein at least two of the blades are a co-planar pair.

7. The aperture module of claim 6, wherein the blades are provided as co-planar pairs in different planes.

8. The aperture module of claim 6, wherein blades disposed in a same plane mutually serve as stoppers.

9. The aperture module of claim 1, further comprising a position sensor to oppose the driving magnet.

10. The aperture module of claim 1, wherein rotation shafts of the blades form a non-regular polygon when connected to each other.

11. An aperture module comprising:
    blades configured to form an incident hole having adjustable sizes;
    a magnet portion comprising a driving magnet opposing a driving coil and configured to be linearly reciprocatable; and
    a rotation plate linked to the magnet portion and to the blades, and configured to convert linear motion of the magnet portion into rotational motion of the blades,
    wherein at least two of the blades are disposed side by side in a same plane.

12. The aperture module of claim 11, wherein the blades comprise three or more blades.

13. The aperture module of claim 11, wherein the blades are provided as co-planar pairs in different planes.

14. The aperture module of claim 11, wherein the incident hole forms a regular polygon having an odd number of sides.

15. The aperture module of claim 11, wherein blades disposed in a same plane mutually serve as stoppers.

16. A camera module comprising:
    a housing;
    a lens module accommodated in the housing; and
    an aperture module comprising an even number of blades configured to form a variably-sized polygonal incident hole having an odd number of sides,
    wherein four sides of the housing, disposed parallel to an optical axis direction of the housing, are provided with a first optical image stabilization (OIS) driving coil configured to provide driving force to move the lens module in a first direction, perpendicular to the optical axis direction, a second OIS driving coil configured to provide driving force to move the lens module in a second direction, perpendicular to the optical axis direction and the first direction, an autofocusing (AF) driving coil configured to provide driving force to move the lens module in the optical axis direction, and an aperture driving coil configured to drive the blades.

* * * * *